July 8, 1958   J. L. HILTON   2,842,066
GEAR PUMP
Filed May 18, 1955   2 Sheets-Sheet 1
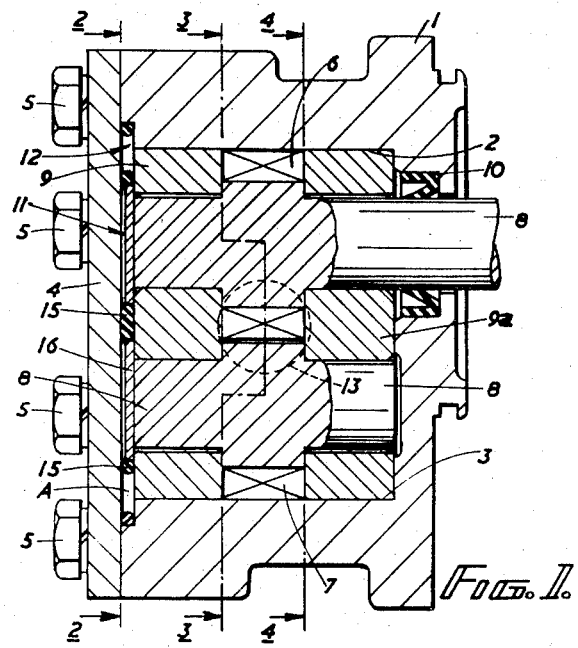
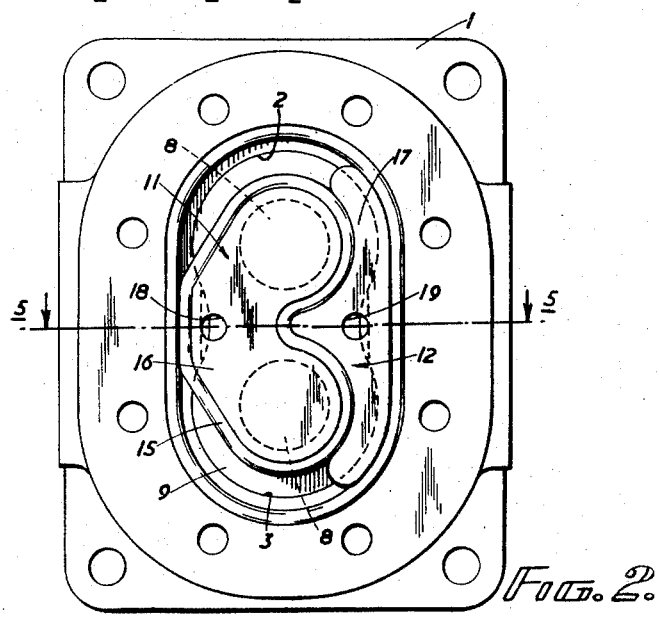
INVENTOR
JOHN LESLIE HILTON.
BY
ATTORNEY July 8, 1958 — J. L. HILTON — 2,842,066
GEAR PUMP
Filed May 18, 1955 — 2 Sheets-Sheet 2
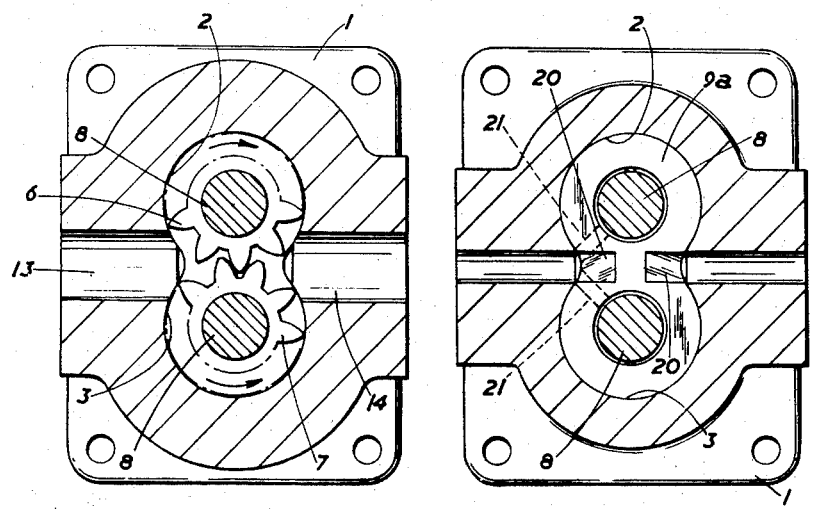
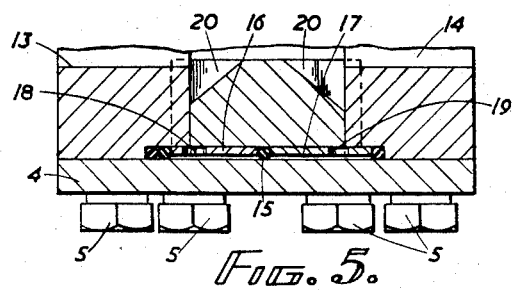
INVENTOR
JOHN LESLIE HILTON.
BY
ATTORNEY United States Patent Office 2,842,066
Patented July 8, 1958

2,842,066

GEAR PUMP

John Leslie Hilton, Hornchurch, England, assignor to The Plessey Company Limited, Ilford, England, a British company Application May 18, 1955, Serial No. 509,164

Claims priority, application Great Britain May 21, 1954

4 Claims. (Cl. 103—126)

This invention relates to gear pumps. A gear pump with which the present invention is concerned comprises a housing including two chambers which accommodate two inter-meshing, displacing gears.

Gear pumps have the advantage of simplicity of construction, but satisfactory operation at high delivery pressures can be achieved only by careful mechanical design, as the volumetric efficiency of such pumps tends to fall as the fluid pressure across the sealing faces, and hence the leakage, is increased.

Volumetric efficiency can be increased up to a point by machining the pump parts to a high degree of accuracy, but the improvement thereby attained is limited by the fact that the less the clearance employed between relatively moving parts the greater is the danger of the pump seizing in operation. Also, a pump having very small initial working clearances is unlikely to have a long working life and is liable to deteriorate rapidly in efficiency.

Some of the problems of design of gear pumps have been solved by pressure loading; in a pressure loaded pump the sealing between the side faces of the gears and the adjacent stationary member defining the chamber is improved by loading that member against the gear face by a pressure which is related to the delivery pressure of the pump and hence to the pressure within the chamber.

In the conventional pump design with pressure loading, the bearing bushes are formed with flanges which form the end walls of the pump chambers and a separate bushing is provided for each journal.

A difficulty arises in having separate bearings or bushes with mating surfaces for each individual journal, for example, the bearings or bushes tend to lock in the pump housing so that they are not free to float axially, which is essential in a pump with pressure loading, and this, to some extent, tends to prevent the bearings from maintaining close contact with the side faces of the gears. Also the mating faces between adjacent bushes or bearings are liable to damage by fretting corrosion, particularly if the working conditions tend to induce relatively high frequency variations of pressure, such as occur from the chatter of a relief valve.

An object of the present invention is to provide improvements in gear pumps for high and low viscosity fluids operating at high delivery pressures.

A further object of the invention is to provide a gear pump in which effective sealing on or against the side faces of the gears is obtained by pressure loading.

Another object of the invention is to provide a gear pump in which bearing plates are so constructed and mounted as to ensure that they are at all times able to float axially, and are not sensitive to the effect of rapid pressure fluctuation.

It is also an object of the invention to provide an improved gear type fluid displacement device having a floating bearing plate which is common to both gears, and which is pressure-loaded into contact with the gears by fluid under pressure from the high-pressure side of the device acting direct upon the outer face of the bearing plate.

In carrying the present invention into effect it is advantageous to provide a chamber with a reinforced sealing member on the outer faces of at least one bearing for effecting high pressure and low pressure zones; the high pressure zone being operatively connected with fluid at high pressure from the outlet side of the pump and the low pressure zone being operatively connected with fluid at low pressure from the inlet side of the pump. In this way the centre of pressure acting on the outer faces of the bearings can be brought into substantial alignment with the centre of pressure acting on the inner faces of said bearings.

The sealing means preferably consists of an endless flexible member which surmounts a rigid member of less thickness than the depth of said chamber and having a profile conforming to one of the pressure zones.

Features and advantages of the invention will also appear from the following description of an embodiment thereof, given by way of example, only, in conjunction with the accompanying drawing in which:

Fig. 1 is a sectional elevation of a gear pump in accordance with the invention, Fig. 2 is a view in section on the line 2—2 of Fig. 1, Fig. 3 is a view on the line 3—3 of Fig. 1, Fig. 4 is a view on the line 4—4 of Fig. 1, and Fig. 5 is a part section on the line 5—5 of Fig. 2.

A pump housing 1 is provided with two overlapping cylindrical chambers 2 and 3 having an end cover 4 being held tightly against the end face of the housing 1 by bolts 5.

A pair of gears 6, 7 which mesh in the overlapping cylinders 2 and 3 are provided with axially extending journals 8 and bearing bushes or plates 9, 9ᵃ supporting said journals 8 are inserted in the housing 1 in contact with the respective outer faces of the gears 6, 7, to form side walls of the pump chambers 2, 3.

Said bearing bushes 9, 9ᵃ conform to a figure eight in configuration and have a slide fit in the pump housing 1.

A rotary oil seal 10 is arranged in the housing 1 to provide a fluid tight seal around the journal forming the power shaft. A chamber A is formed between the outer face of one bearing bush 9 and inner face of the end cover 4. Said chamber A is divided into two zones or chambers 11, 12 by means of a reinforced sealing member and said bearing bush 9 is urged towards the gears 6 and 7 by a side load derived from the pressures in the separate chambers 11, 12.

With the direction of rotation of gears 6, 7 as indicated by the arrows in Fig. 3, 13 is the inlet port and 14 is the outlet port.

The sealing member consists of an endless flexible ring 15 which surrounds the low pressure chamber 11 and is adapted to be sealingly compressed between the outer face of the face of the bearing bush 9 and the inner face of the end cover 4 to isolate the two chambers 11, 12.

A separate pressure relief plate 16 of less depth than chamber 11 is provided to prevent the ring 15 from collapsing and has a configuration conforming to the peripheral shape of the low pressure chamber 11 which is bounded by the ring 15, and a guide plate 17 in the high pressure chamber assists in maintaining the shape of the ring as shown in Fig. 2.

The pressure relief plate 16 is provided with a port 18 adjacent the inlet 13 and the plate 17 has a similar port 19 adjacent the outlet port, to ensure equalisation of the pressures on both sides of the plates.

The inner face of each bearing bush 9, 9ᵃ is cut away at 20 transversely adjacent to the inlet port 13 and outlet port 14 to enable fluid in the section side to enter through the ends of the gear teeth and to prevent fluid on the high pressure side being trapped between the gear teeth.

The outer faces of the bearing bushes have grooves 21 to port the fluid from the journals back to low pressure.

I claim:

1. A gear type fluid displacement device comprising a housing having two interconnected chambers, two intermeshing displacing gears mounted for rotation in said chambers in such manner as to separate two parts of said chambers to form a high pressure part at one side and a low pressure part at the other side of the zone in which the gears mesh, said gears having journals extending axially therefrom, at least one one-piece bearing plate having two parallel end faces and bearing bores supporting the journals of both said gears, extending from one to the other of said end faces, said bearing plate being supported in the housing so as to be movable in said housing axially of said journals, means admitting fluid from the high-pressure zone of the housing to part of the outer end face of said bearing plate to urge said plate into contact with said gears, the size of said isolated part of said face being such that the action of said admitted pressure on said part will balance or slightly over-balance the resultant force on the opposite side of said plate caused by the pressure gradient of the fluid in the pumping chamber, an endless flexible sealing member interposed between the housing and said outer end face of the bearing plate in sealing contact with both said housing and bearing plate so as to isolate a part of said face from the part to which said pressure is admitted, said separated part including the ends of the two bearing bores, and passage means being provided connecting the chamber enclosed between said isolated part of said outer end face and the pump housing to the low-pressure zone of the device.

2. A fluid displacement device as claimed in claim 1, wherein the periphery of the bearing plate is in sealing contact with the housing and said sealing member surrounds said isolated part of the outer end face of the bearing plate.

3. A fluid displacement device as claimed in claim 1, wherein two bearing plates are provided, one at each side of the displacement gears.

4. A fluid displacement device as claimed in claim 1, wherein the sealing means are so arranged that the isolated part is mainly situated at one side of the plane determined by the shaft axes of the gears.

References Cited in the file of this patent

UNITED STATES PATENTS

| | | |
|---|---|---|
| 2,641,192 | Lindberg | June 9, 1953 |
| 2,714,856 | Kane | Aug. 9, 1955 |
| 2,772,638 | Nagley | Dec. 4, 1956 |

FOREIGN PATENTS

| | | |
|---|---|---|
| 463,304 | Italy | Apr. 26, 1951 |
| 1,105,262 | France | June 29, 1955 |
| 1,121,180 | France | Apr. 30, 1956 |